Dec. 10, 1929.　　S. M. LAFFERTY ET AL　　1,739,148
DISPLAY DEVICE
Filed Nov. 17, 1926　　4 Sheets-Sheet 1

INVENTORS
Samuel M. Lafferty and Howard J. Burgwin
by William B. Wharton
their attorney Dec. 10, 1929.    S. M. LAFFERTY ET AL    1,739,148
DISPLAY DEVICE
Filed Nov. 17, 1926    4 Sheets-Sheet 2

INVENTORS
Samuel M. Lafferty
and Howard J. Burgwin
by William B. Wharton
their attorney Dec. 10, 1929.                S. M. LAFFERTY ET AL                1,739,148
                                   DISPLAY DEVICE
                         Filed Nov. 17, 1926      4 Sheets-Sheet 3

INVENTORS
Samuel M. Lafferty and Howard J. Burgwin
by William B. Wharton
their attorney Dec. 10, 1929.  S. M. LAFFERTY ET AL  1,739,148
DISPLAY DEVICE
Filed Nov. 17, 1926   4 Sheets-Sheet 4
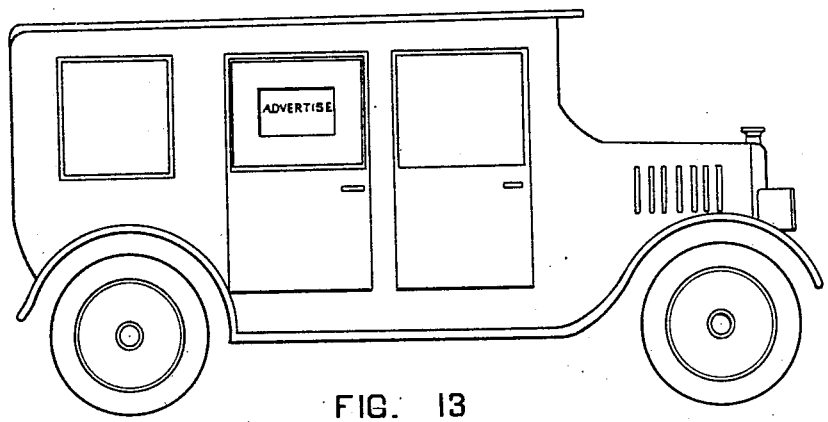
FIG. 13
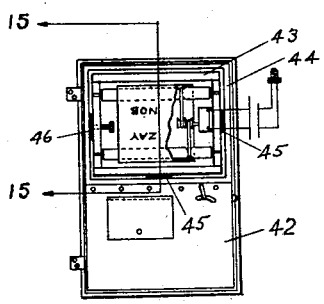
FIG. 14
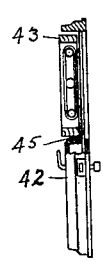
FIG. 15
FIG. 16
FIG. 17
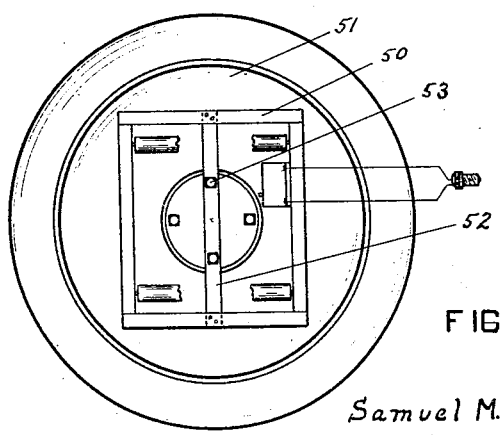
FIG. 18
INVENTORS
Samuel M. Lafferty & Howard J. Burgwin
by William B. Wharton
their attorney Patented Dec. 10, 1929

1,739,148

UNITED STATES PATENT OFFICE

SAMUEL M. LAFFERTY AND HOWARD J. BURGWIN, OF PITTSBURGH, PENNSYLVANIA, ASSIGNORS TO BURGWIN-HERRON MOTOR COMPANY, OF PITTSBURGH, PENNSYLVANIA, A CORPORATION OF PENNSYLVANIA

DISPLAY DEVICE

Application filed November 17, 1926. Serial No. 148,864.

This invention relates to a display device for use on automobiles.

One object of the invention is to provide a display device which is so arranged that a screen carrying the matter to be displayed may be maintained in motion, thus attracting the eye and calling such matter to the attention of an observer.

Another object of the invention is to so arrange the display device that it may be mounted in the spare tire rim usually carried at the rear of an automobile, and the mechanism of the device protected by the tire cover for such spare tire.

Further objects of the invention are to so arrange the driving mechanism for the movable display screen that it may be actuated by electrical connection with the ignition system of the automobile, and to so arrange such driving mechanism that the rollers carrying the movable screen of the device are so actuated as to prevent slippage of the screen and keep it taut at all times.

Figure 1:
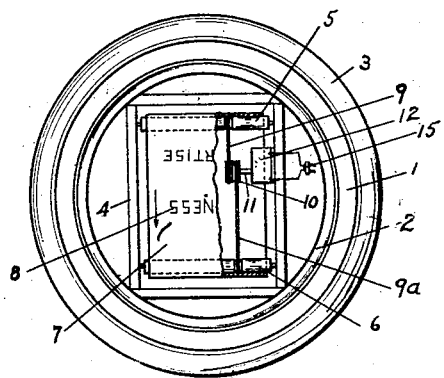
Figure 2:
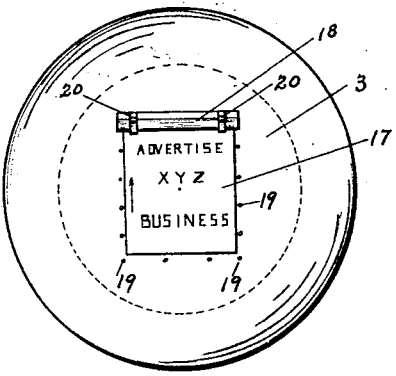
Figure 3:
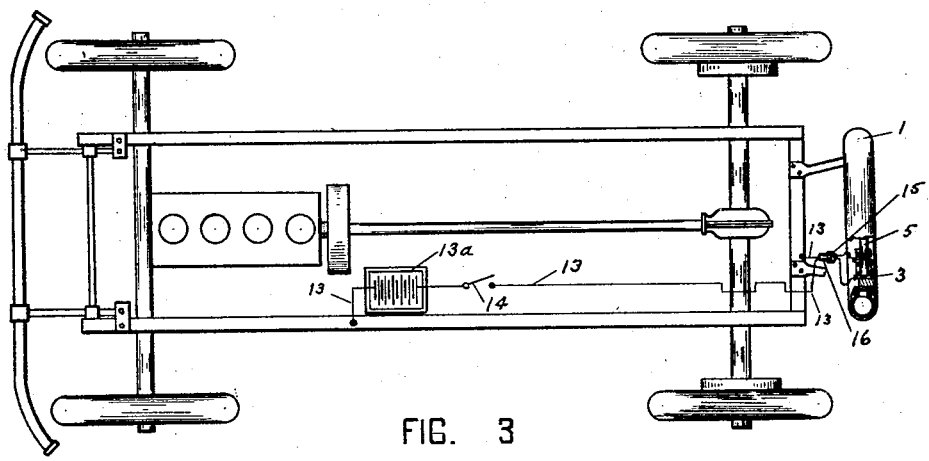
Figure 4:
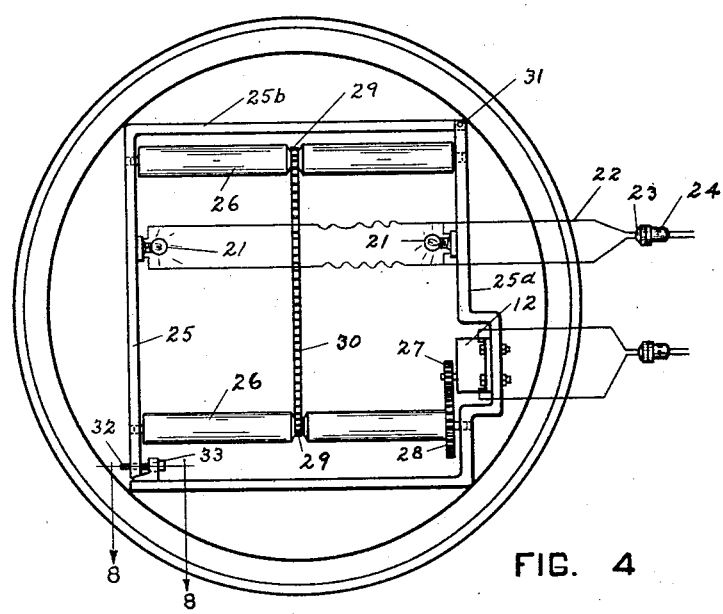
Figure 7:
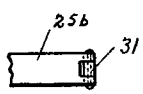
Figure 8:
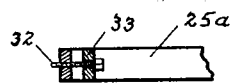
Figure 6:
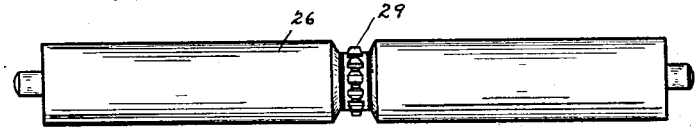
Figure 5:
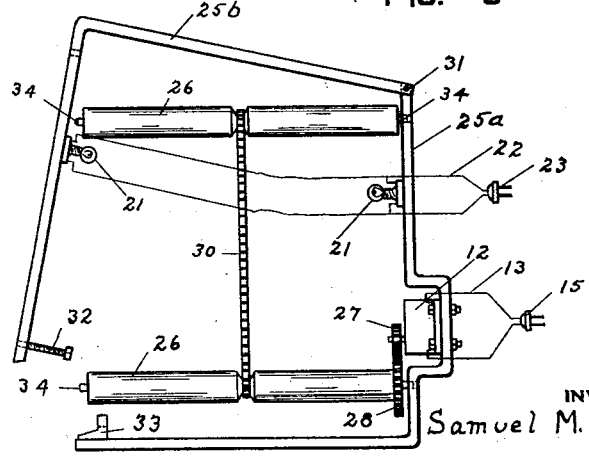
Figure 11:
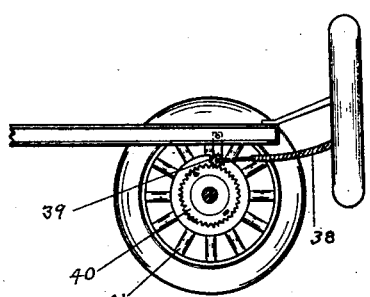
Figure 10:
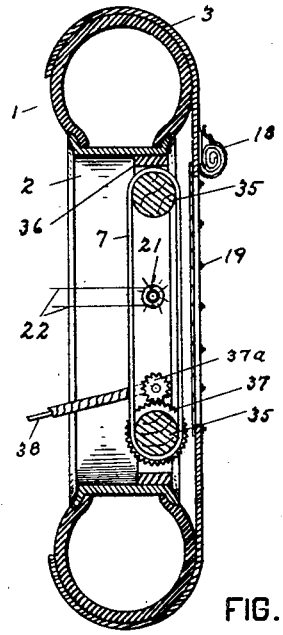
Figure 12:
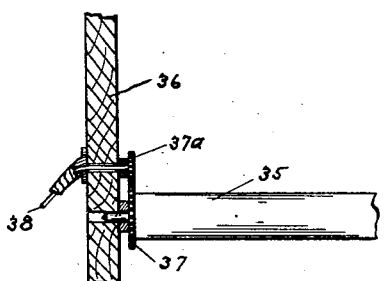
Figure 9:
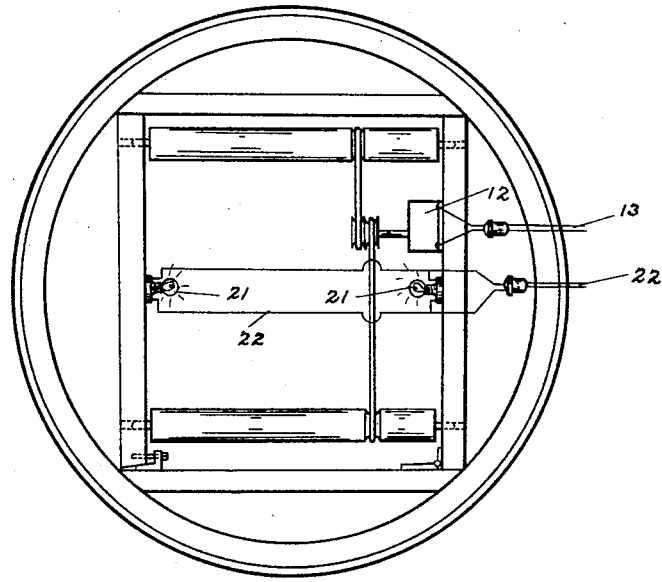

In the accompanying drawings Figure 1 is a rear elevation of the display device in position in the rim of a tire, a portion of the movable screen of the device being broken away to show the actuating mechanism therefor; Figure 2 is a front elevation of the spare tire and tire cover in which the display device is mounted, the shutter provided in such tire cover being rolled back to expose the screen of the display device to view; Figure 3 is a plan view of the chassis of an automobile, showing the spare tire with the display device therein, and electrical connections to the ignition system of the automobile for actuating such display device; Figure 4 is a front elevation of the device, the tire cover and tire being removed, showing modified connections from the electric motor to the rollers which carry the screen for actuating the rollers, and a modified form of frame for supporting the rollers and the actuating means; Figure 5 is a front elevation of the frame, rollers, and actuating connections of the device, showing this modified form of frame disengaged to permit the removal of the rollers; Figure 6 is a detail elevation of the modified form of roller; Figure 7 is a detail view showing the manner of connecting or hinging the two members of the modified form of frame; Figure 8 is a sectional view on line 8—8 of Fig. 4 showing the bolt fastening of the frame; Figure 9 is a front elevation of a tire rim and frame similar to that shown in Figure 1 with the exception that lighting means for illuminating the screen are provided, and the screen itself and the tire on the rim are omitted for the sake of clearness in illustration; Figure 10 is a vertical sectional view through a tire rim and tire, showing mechanical means for actuating the rollers which carry the screen of the device; this view also illustrates particularly the structure of the tire cover and the shutter for covering a window therein; Figure 11 is a detail elevation showing a wheel and driving connections for the mechanical actuating means shown in Figure 9; Figure 12 is a detail view illustrating the direct connections to one of the rollers of the device; Figure 13 is a side elevation of an automobile, showing a display device on the same general structure mounted in a window of the automobile; Figure 14 is a rear elevation of the door and window of the automobile, showing the display device in position; Figure 15 is a vertical sectional view on the line 15—15 Fig. 13; Figure 16 is a front elevation of the display device in itself; Figure 17 is a detail view of means for attaching the display device in the window of an automobile; and Figure 18 is a front elevation of a wheel of the disk type, showing the display device in position thereon.

In the drawings the reference numeral 1 designates a spare tire, which is mounted on a rim 2 and is covered by a tire cover 3.

Within the rim 2 of the spare time 1 is a frame 4, in which are trunnioned rollers 5 and 6 carrying a screen 7 of canvas or other suitable material. This screen 7 is provided with printed legends 8, or such illustrations or other matter as it is desired to display.

The screen 7 is kept in motion by rotation of the rollers 5 and 6. As shown in Figures 1 and 9, this is effected by two belts 9, and $9^a$, which passes over both rollers and over a pulley 10 on the shaft 11 of an electrical motor 12. By using a double pulley as shown, and passing the belts 9 and 9ª over each of the rollers 5 and 6, both rollers are positively actuated. This keeps the screen 7 taut on the rollers, and produces a smooth and constant movement of the screen. The motor 12 receives electrical power by means of a connecting wire 13 leading to the ignition battery 13ª of the automobile. A switch 14 controls the passage of current to the motor and permits the screen 7 to be actuated at will.

In order to permit a simple disconnection of the wires carrying current for the motor, a plug 15 engaging with a socket 16 in the line circuit 13 is preferably provided. This engagement is shown particularly in Figure 9 of the drawings.

It will be noted that the tire cover 3 serves to protect the motor and other elements of the mechanism. In order that the motor on the screen may be exposed to view without exposing the same to dust or moisture, a transparent window 17 is desirably provided in the tire cover 3. This window in turn is desirably covered by a flexible shutter 18, which may be of the same material as the remainder of the tire cover. When in position to cover the window 17 the shutter 18 may be buttoned down thereover by means of snap buttons 19, and when not in use may be maintained in rolled position by means of straps 20.

The device presents several marked advantages in that when mounted on an automobile it occupies waste space thereon, so that its use does not require the addition of any mounting means or give the effect of cluttering the body of the vehicle. As the movable members are actuated by current from the ignition system of the automobile itself, the device is rendered both compact and economical in its operation. The fact that the screen carrying the desired legend or device is in smooth and constant motion attracts the eye of an observer, and directs attention to the matter on the screen in a much greater degree than if a member carrying such legend or device were stationary.

As shown in Figures 4, 5, 9, and 10 the device is preferably provided with one or more electric lamps 21, which are mounted to illuminate the screen, so that the matter on it will be visible during use of the car at night. The lamps 21 are on a circuit 22 which may also receive current from the battery 13ª. In order that the frame may be readily removed from the tire rim this circuit 22 is desirably provided with a plug 23 engaging a socket 24, similar to plug 15 and socket 16 in the actuating circuit 13.

In the modified form of the device shown in Figures 4 to 8 inclusive of the drawings, the frame 25 is so constructed that the rollers 26 may be readily removed from the frame and others substituted therefor. The ready removal of the rollers also facilitates the application of a new screen 7, when it is desired to change the matter shown by the display device.

In this form modified driving connections from the motor to the rolls are also shown. As shown in Figures 4 and 5, the motor 12 has on the shaft thereof a pinion 27 meshing with a gear 28 on one of the rollers 26. Rollers 26 are each provided with an inset sprocket 29, and are connected by a sprocket chain 30. This structure insures a smooth and positive actuation of both rollers by the connection of one with the actuating motor of the device.

The frame 25 is formed in two L-shaped sections 25ª and 25ᵇ, which are pivotally interconnected at a point 31. The frame portion 25ᵇ carries a bolt 32, which is arranged to engage in a yoke 33 in the frame member 25ª. When the rollers 26 are to be removed from the frame, the bolt 32 is loosened, and the frame member 25ᵇ swung outwardly on the pivot point 31. At the beginning of this movement the trunnions 34 of the rollers which engage in this frame member are withdrawn from their sockets; and after frame member 25ᵇ has been swung outwardly a sufficient distance the trunnions 34 at the other ends of the rollers may likewise be withdrawn to remove the rollers from the frame.

While it is desirable to actuate the screen carrying rollers by a motor which receives current from the ignition system of the car, it is possible to actuate the rollers mechanically from a moving part of the car. In Figures 10, 11, and 12 a modified arrangement is shown by which such mechanical actuation is effected. Such arrangement is, however, inferior to the motor driven form of the device both because of its more complicated nature and because the speed of the screen will in such arrangement vary with the speed at which the car itself is driven.

Such mechanical actuating means comprises rollers 35 trunnioned in a frame 36, and carrying a screen 7 identical with that shown in the other forms of the device. In this modification one of the rollers 35 is provided with a gear 37 with which meshes a pinion 37ª. Pinion 37ª is actuated by a flexible connection 38 with a second pinion 39, which meshes with a gear 40 on the wheel 41 of the car. In this modification the screen 7 is shown as driven from one roller only. It should be understood, however, that a sprocket and sprocket chain connection, such as that shown in Figures 4, 5, and 6, may be applied to the rollers of this form equally as well as to those of the motor driven form shown in such figures of the drawings.

In the modification shown in Figures 13 to 17 inclusive of the drawings, an electrically actuated display device of the type described above is shown mounted in the window of an automobile. As shown particularly in Figures 13, 14, and 15 this window is in a door 42 of the car. The frame 43 of the display device is made of such size and shape as to fit in the window frame 44. This fit is made loose, and the frame 43 is provided with compressible contact pads 45 and 46 of rubber or the like to make actual contact with the window frame. Contact pad 46 is carried by a member 47, which has a screw threaded engagement in the frame 43, and is provided with a suitable head 48. By this means the display device as a whole may be given a frictional engagement in the window frame. In order to render the display device more sightly, a mat 49 of any suitable material is preferably secured to the frame to cover the operating mechanism of the device and disclose only the screen carrying the matter to be displayed.

Figure 18 of the drawings shows a display device having a frame 50 secured to a disk wheel 51. In order to secure the device to a wheel of this sort, the frame 50 has secured thereto a cross bar 52. This cross bar 52 is perforated to receive certain of the hub bolts 53 of the wheel. As disk wheels are materially dished, and as the display device as a whole is of slight depth, the device may be enclosed by a tire cover equally as well as when it is set within a tire rim.

What we claim is:

1. A display device for automobiles comprising a frame having two mutually pivoted sections, rotatable members removably trunnioned in said frame, an endless screen on said rotatable members, driving connections and actuating means for producing a continuous progressive movement thereof arranged to be supported in a tire rim, a tire cover arranged to enclose the device, said tire cover being provided with an opening and serving as a border to enframe the visible portion of the aforesaid screen.

2. A display device for use in conjunction with a spare tire rim on an automobile comprising the combination of a tire cover arranged to cover said rim and a tire thereon, display means comprising an endless screen and means for producing a continuous progressive movement thereof arranged to be supported in the tire rim and to lie wholly within the space enclosed by said rim, and said tire cover being provided with an opening shaped to effect the tire cover a border for the visible portion of the endless screen.

In witness whereof, we hereunto set our hands.

SAMUEL M. LAFFERTY.
HOWARD J. BURGWIN.